Aug. 30, 1932. S. M. JONSSON 1,874,541
LUBRICATING DEVICE
Filed May 14, 1928

Sven M. Jonsson
INVENTOR

Patented Aug. 30, 1932

1,874,541

UNITED STATES PATENT OFFICE

SVEN M. JONSSON, OF WOODSIDE, NEW YORK, ASSIGNOR, BY MESNE ASSIGNMENTS, TO THE LUBRICATION CORPORATION, OF SOUTH BEND, INDIANA, A CORPORATION OF DELAWARE

LUBRICATING DEVICE

Application filed May 14, 1928. Serial No. 277,587.

This invention relates to lubricating devices with particular reference to a coupling means, whereby a grease gun or pump may be connected to a bearing which it is desired to lubricate.

The objects of my invention are to provide a nipple adapted to be firmly attached to various bearings and said nipple being adapted to provide a suitable inlet for lubricant to said bearings, and to further provide a coupling which will readily fit on to the nipple and form a detachable, but grease or oil tight, connection between said bearing and a grease gun, such as shown in my co-pending patent application.

A further object is to provide therein a coupling which may be attached or detached with a single motion, and in which the connecting of the gun and coupling may be made through a wide variety of angles. A further object is to provide a connection which will reduce the possibility of introducing dirt into the bearing.

Other objects and advantages of this invention will more fully appear in the following description, illustrated by the accompanying drawing in which Figure 1 is a longitudinal section of the nipple.

Figure 1:
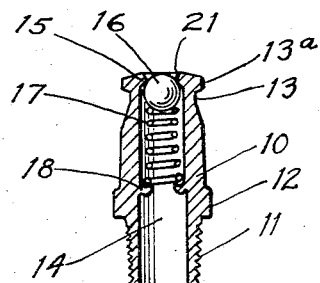

Referring now to Figure 1, there is shown a nipple having a body (10) provided with a screw thread (11) at one end so that it may be screwed into a bearing or shaft needing lubrication. In order to screw the nipple into a bearing a hexagon flange (12) is provided at a point close to the thread. The outer end of the nipple is substantially a tapered cylinder, or cone frustrum, but with an annular groove (13) around it, thereby forming a flange (13a) at the end of said nipple, the object of which will be hereinafter described.

The nipple has an opening (14) throughout its length to provide a passage for lubricant and at the outer end of said opening has an annular inwardly extending flange (15) forming a seat for a ball valve (16). A spring (17) is provided to keep the ball on its seat and said spring is retained within the opening by the projections (18).

Figure 2:
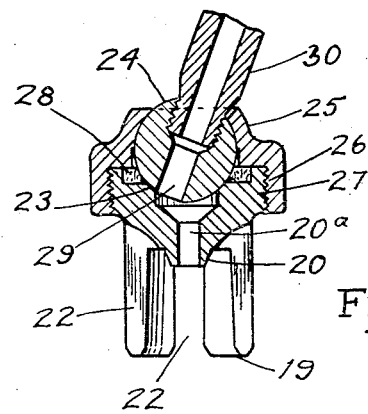
Figure 2 is a longitudinal section of one form of coupling adapted to be used with the nipple shown in Figure 1.

The coupling shown in Figure 2 is formed with a sleeve (19) adapted to fit over the outer end of said nipple. At the inner end of the recess formed by said sleeve is a conical nozzle (20) adapted to fit in the opening of the nipple at its outer end. An annular seat (21) is provided on the outer end of said nipple, said seat being preferably formed at the same angle as the conical nozzle (20).

Figure 3:
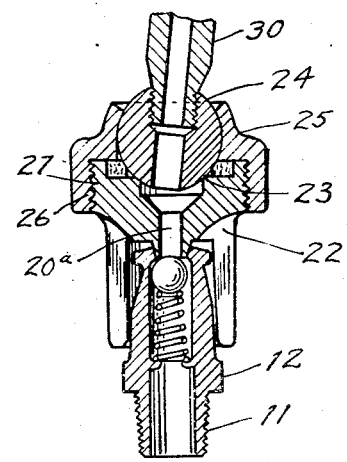
Figure 3 is a longitudinal section showing the nipple used with the coupling shown in Figure 2.

The nozzle (20) has an opening (20a) therethroughout (so that when the coupling is placed on the nipple as shown in Figure 3, there is a continuous opening through both coupling and nipple) for the passage of lubricant. It will be seen by reference to Figure 3 that the conical nozzle (20) when forced into the seat (21) of the nipple, will displace the ball (16) and at the same time if pressure is applied upon the coupling the nozzle will form an oil or grease-tight connection at the seat (21).

The axis of the nozzle (20) and the axis of the conical seat (21) are kept in alignment by the guiding action of the sleeve of the coupling as it fits over the outer end of the nipple.

It is found in practice that nipples, when used on automobiles, are often covered with dirt. In order to prevent dirt from being carried into the openings of the nipple and coupling, I provide slots (22) in the sleeve, so that dirt dislodged from the end of the nipple may fall out of said slots.

At one end of the coupling is a seat (23) adapted to receive a ball (24), said ball being held against the seat (23) by the collar (25) which is screwed to the coupling by the threaded parts (26 and 27). A packing ring (28) of soft or elastic material is disposed between said coupling and said ball to prevent the escape of lubricant when under pressure. The ball has an opening (29) therethrough for the passage of lubricant and is adapted for attachment to a grease conduit or tube (30) of a grease gun of any suitable construction, preferably a grease gun operated by a pressure stroke adapted to hold the conical nozzle close upon its seat.

It will be seen that the ball joint formed by the ball (24) will permit the coupling to be placed on the nipple while the gun is held at various angles, thereby permitting the gun to be used on nipples which would be otherwise difficult to reach.

It has been found in automobile practice that two kinds of couplings are desirable, both adapted to be used on one nipple. The coupling hereinbefore described is suitable for a small hand grease gun such as may be used by automobile owners when lubricating their own cars. However, for service station use, it is desirable to have a coupling which may be attached to a flexible hose extending from a large portable grease pump or gun.

It will be apparent that the operator would have difficulty in holding the coupling shown in Figure 2 in grease-tight contact with the nipple while at the same time operating the larger grease pump. The nipple shown in Figure 1 is therefore so made that a coupling such as that shown on Figure 3 may be connected thereto without great pressure being required to hold said coupling and said nipple in grease-tight connection.

Figure 5:
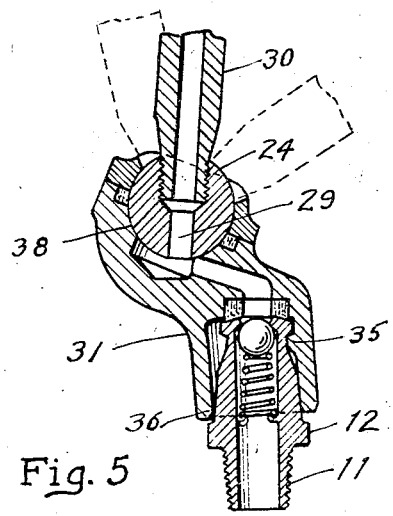
Figure 5 is a longitudinal section of the nipple in use with the coupling as shown in Figure 4.

Referring now to Figure 3, the coupling (31) has a sleeve (32) adapted to fit over the nipple (10) as shown in Figure 5. The inner end of the recess in the sleeve has a seat (33) provided for a packing ring (34) of cork or other suitable material adapted to form a grease-tight joint. Within the sleeve at one side thereof is an arcuate projection (35) adapted to fit beneath the flange (13a) of the nipple when the coupling is displaced to one side after being fitted over said nipple.

It will be seen that the outer edge (36) of the sleeve will fit closely around the base of said nipple, when the coupling is in position on the nipple, and when the coupling is displaced to one side it will move pivotally around the base of said nipple. The center of the ring (34) is therefore positional at one side of the axis of the sleeve (36) so that when the coupling is displaced to one side, the ring (34) is substantially in alignment with the opening of the nipple.

I prefer to bevel the inner face of the flange (13a) and the inner surface of the projection (35) is correspondingly beveled. Thus when the projection (35) is forced into the groove (13) the ring (34) will be pressed firmly upon the end of the nipple, forming a lubricant-tight connection.

Figure 4:
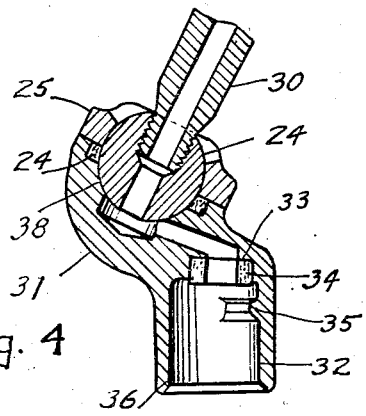
Figure 4 is a longitudinal section illustrating another kind of coupling, adapted for use with the nipple.

The coupling (31) in Figures 4 and 5 has a seat (38) to receive a ball (24) and form a ball joint as described in the coupling (Figure 2). But it is desirable to place the ball connection of said coupling (31) at a considerable offset from the opening of the sleeve (32). The object of this offset is to cause displacement of the coupling (37) when it is placed on the nipple and pressure is applied axially along the tube (30). Referring to Figure 5 it will be seen that the tube (30) may be used at any angle between the dotted lines which indicate the tube (38) at its extreme positions.

While I have shown the preferred form of my invention, nothing that has been specified in this description is intended as a limitation of the scope of the invention except as indicated in the following claims:

I claim:

1. In combination, a nipple having an annular external radially projecting flange adjacent its receiving end, and a coupling for engaging said nipple comprising, a sleeve adapted to fit over said nipple end, an internal projection on said sleeve adapted to engage beneath said flange in any radial position with respect to the flange, the bore of said sleeve being larger than the flange on said nipple whereby, when the sleeve is passed over the nipple, the edge of said sleeve serves as a fulcrum to rock said projection into engagement with the flange on said nipple.

2. In combination, a nipple having an annular external radially projecting flange adjacent and surrounding its receiving end, and a coupling for engaging said nipple and comprising, a sleeve adapted to fit over said nipple end, the bore of said sleeve being larger than the flange on said nipple, a lubricant sealing means in said sleeve for engaging with the end of said nipple when disposed in the sleeve, a projection on the interior of said sleeve adjacent, but spaced from said sealing means and adapted to engage beneath the flange on said nipple in any radial position with respect thereto and a lubricant supply member connected with said sleeve and serving as a handle whereby to rotate said coupling about one edge of said sleeve as a fulcrum to engage said projection and flange for effecting a seal between said sealing means and said nipple end.

In testimony whereof I have affixed my signature.

SVEN M. JONSSON.